United States Patent [19]
Orihara et al.

[11] Patent Number: 5,276,774
[45] Date of Patent: Jan. 4, 1994

[54] DEVICE AND METHOD FOR ANALOGICAL REASONING

[75] Inventors: Ryohei Orihara, Tokyo; Kazue Nagao, Kanagawa; Hideyuki Inoue, Kanagawa; Takashi Takayanagi, Kanagawa, all of Japan

[73] Assignee: Kabushiki Kaisha Toshiba, Kawasaki, Japan

[21] Appl. No.: 708,725

[22] Filed: May 31, 1991

[30] Foreign Application Priority Data

May 31, 1990 [JP] Japan .................................. 2-142966
Sep. 27, 1990 [JP] Japan .................................. 2-258439

[51] Int. Cl.⁵ ............................................. G06F 9/00
[52] U.S. Cl. ........................................... 395/51
[58] Field of Search .................................... 395/51, 61

[56] References Cited

U.S. PATENT DOCUMENTS 4,777,585 10/1988 Kokawa et al. ...................... 395/61
4,905,162 2/1990 Hartzband et al. ................... 395/62
5,153,830 10/1992 Fisher et al. ......................... 364/419

OTHER PUBLICATIONS

Dolan et al, "Symbolic Schemata in Connectionist Memories Role Binding and Evolution of Structure", UCLA-AI-87-11 Apr. 1987, pp. 1-23.
Dolan et al, "Towards the Evolution of Symbols," Proceedings of 2nd Inter. Conf. on Genetic Algorithms, 28-31 Jul. 1987, pp. 123-131.
Indurkhya, Bipin. "Approximate Semantic Transference: A Computational Theory of Metaphors and Analogies", 1987, pp. 445-480, Cognitive Science 11.
R. Orihara et al. "Proc. of symposium on new paradigms of machine learning and their applications", 1989, pp. 89-98, Ohie-No-1Zumi.

*Primary Examiner*—Allen R. MacDonald
*Attorney, Agent, or Firm*—Oblon, Spivak, McClelland, Maier & Neustadt

[57] ABSTRACT

An analogical reasoning device comprises a knowledge base to store a group of knowledge data described in non-logic symbols and divided into more than one domains according to a certain division standard, an analogy detector to compare the knowledge data in one domain with the those in other domains stored in the knowledge base and determine similar domains containing the knowledge data which can be made identical by replacing a part of the non-logic symbols and an analogical reasoning unit to make analogy for a new knowledge data for the domains determined similar by the analogy detector.

10 Claims, 9 Drawing Sheets

FIG. 7

[DIVISION STANDARD : MEAT, FISH, UNCUT, ROAST, UNROASTED, PAN, BOIL, UNBOILED, FRYING PAN]

DOMAIN ON BLOCK 11.1

MEAT-BLOCK (X) : - MEAT (UNCUT (X)), BLOCK (UNCUT (X),X)
MEAT (UNCUT (X)) : - MEAT-BLOCK (X)
BLOCK (UNCUT (X), X) : - MEAT-BLOCK (X)
} SET OF CLAUSES 11.1.a

FISH-BLOCK (X) : - FISH (UNCUT (X)), BLOCK (UNCUT (X),X)
FISH (UNCUT (X), X)) : - FISH-BLOCK (X)
BLOCK (UNCUT (X), X) : - FISH-BLOCK (X)
} SET OF CLAUSES 11.1.b

BOUILLABAISSE (X) : - FISH-BLOCK (UNBOILED (X)), BOIL (UNBOILED (X), X, PAN)
FISH-BLOCK (UNBOILED (X)) : - BOUILLABAISSE (X)
BOIL (UNBOILED (X), X, PAN) : - BOUILLABAISSE (X)
} SET OF CLAUSES 11.1.c

DOMAIN ON SLICE 11.2

MEAT-SLICE (X) : - MEAT (UNCUT (X)), SLICE (UNCUT (X), X)
MEAT (UNCUT (X)) : - MEAT-SLICE (X)
SLICE (UNCUT (X), X) : - MEAT-SLICE (X)
} SET OF CLAUSES 11.2.a

FISH-SLICE (X) : - FISH (UNCUT (X)), SLICE (UNCUT (X), X)
FISH (UNCUT (X)) : - FISH-SLICE (X)
SLICE (UNCUT (X),X) : - FISH-SLICE (X)
} SET OF CLAUSES 11.2.b

STEAK (X) : - MEAT-SLICE (UNROASTED (X)), ROAST (UNROASTED (X), X, FRYING PAN)
MEAT-SLICE (UNROASTED (X)) : - STEAK (X)
ROAST (UNROASTED (X), X, FRYING PAN) : - STEAK (X)
} SET OF CLAUSES 11.2.c

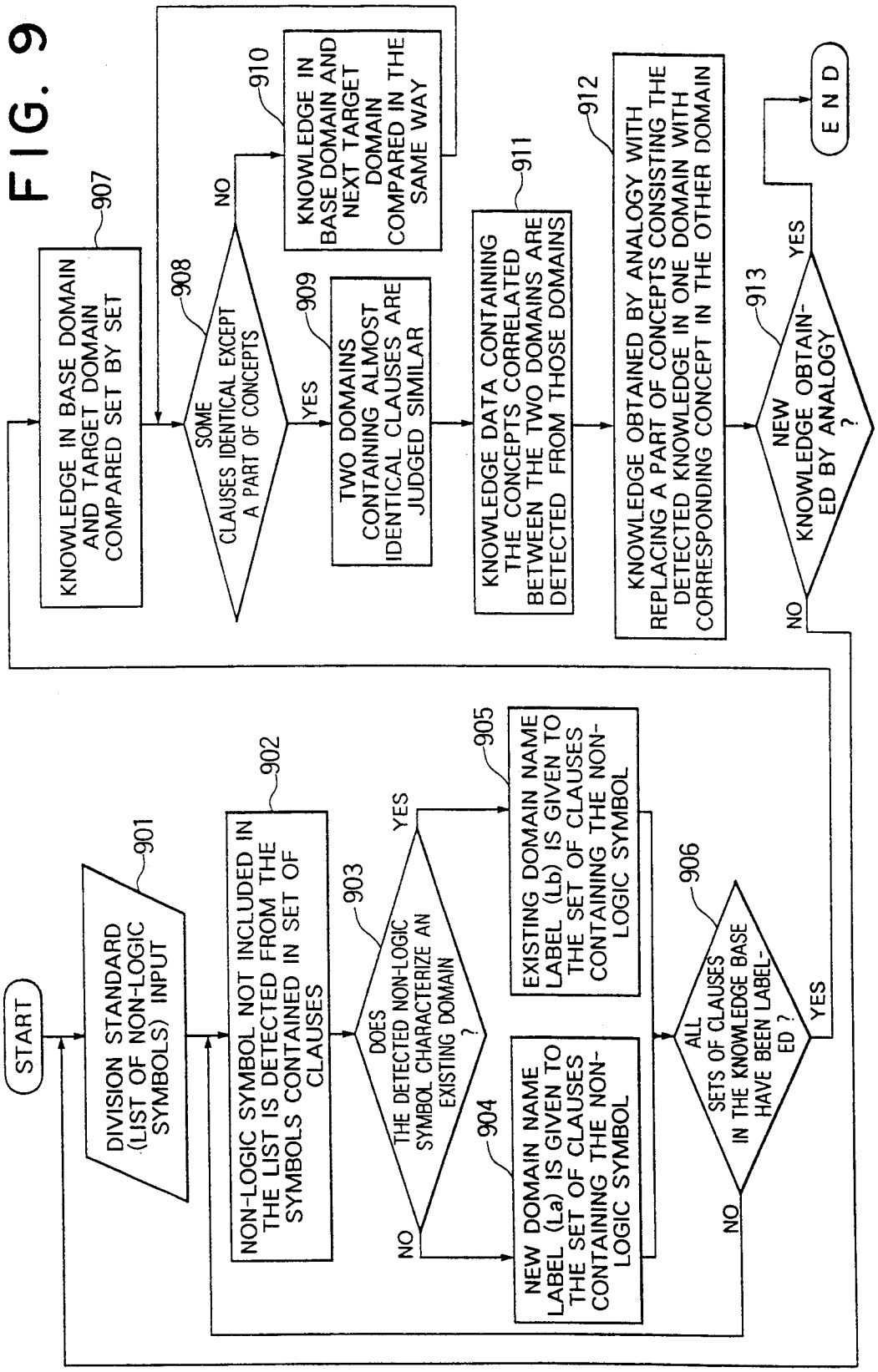

DEVICE AND METHOD FOR ANALOGICAL REASONING

BACKGROUND OF THE INVENTION

This invention relates to an analogical reasoning device and analogical reasoning method to be adopted in inference systems such as expert systems.

Analogical reasoning is known as one of typical high-level inference methods. The analogical reasoning is usually performed for a knowledge base divided into a plurality of domains according to a given standard. A domain is a group of knowledge data which are related. For example, FIG. 2 illustrates two domains. Domain 1.1 pertains to the cooking of meat and domain 1.2 pertains to the cooking of fish. The given standard for dividing the knowledge base in FIG. 2 is the different cooking materials (i.e., meat or fish). A given standard or division standard is how a knowledge base is divided to achieve domains which are similar in nature. Between similar domains, a knowledge valid in one domain is supposed to be acceptable in the other domain when properly converted corresponding to the similarity between the domains. This enables effective utilization of knowledge.

Similarity between two domains is determined by dividing the knowledge into some units and comparing the knowledge structures. When knowledge structures in different domains are the same even in part, these domains are judged to have similarity and treated as the subject of analogical reasoning.

However, such analogical reasoning according to similarity judgment of knowledge structure is fundamentally different from the one in human thinking. Therefore, it cannot be denied that there may be a large discrepancy between the results of them. In addition, the amount of knowledge obtained by analogical reasoning is considerably limited.

SUMMARY OF THE INVENTION

This invention aims to provide an analogical reasoning device and analogical reasoning method for high-level analogical reasoning similar to human thinking.

To achieve this aim, the analogical reasoning device of the present invention comprises memory means for storing a group of knowledge data described in non-logic symbols, which is divided into more than one domain according to a certain division standard, judgment means for comparing the knowledge data in one domain with those in the other domains stored in said memory means and determining similar domains containing the knowledge data which can be made identical by replacing a part of said non-logic symbols, and analogical reasoning means for making analogy for a new knowledge data for the domains judged similar by said judgment means. Non-logic symbols used in the present writing referred to concepts which are expressed without using formal logic. The classical approach to representing knowledge about the world is a sentence such as "All birds have wings" which is formal logic. The present invention does not use conventional formal logic symbols to express data but uses any symbols or concepts which are not logic symbols (i.e., non-logic symbols). The division standard is the above-described standard used for dividing a knowledge base.

Also to achieve this aim, the analogical reasoning method of the present invention makes analogy for a knowledge using a memory means which stores a group of knowledge data described in non-logic symbols and divided into some domains according to a certain division standard. This method comprises the steps of comparing the knowledge data in one domain with those in the other domains stored in said memory means and determining similar domains containing the knowledge data which can be made identical by replacing a part of said non-logic symbols, and making analogy for a new knowledge data for the domains judged similar by said judgment step.

Thus, the present invention realizes a high level of analogical reasoning similar to human thinking, without changing the knowledge data group.

BRIEF DESCRIPTION OF THE DRAWINGS

FIG. 7 shows the knowledge base divided into two domains, i.e. one concerning "blocks" and the other concerning "slices";

FIG. 9 is a flowchart showing the overall operation of the analogical reasoning device of FIG. 8.

DESCRIPTION OF THE PREFERRED EMBODIMENT

Figure 1:
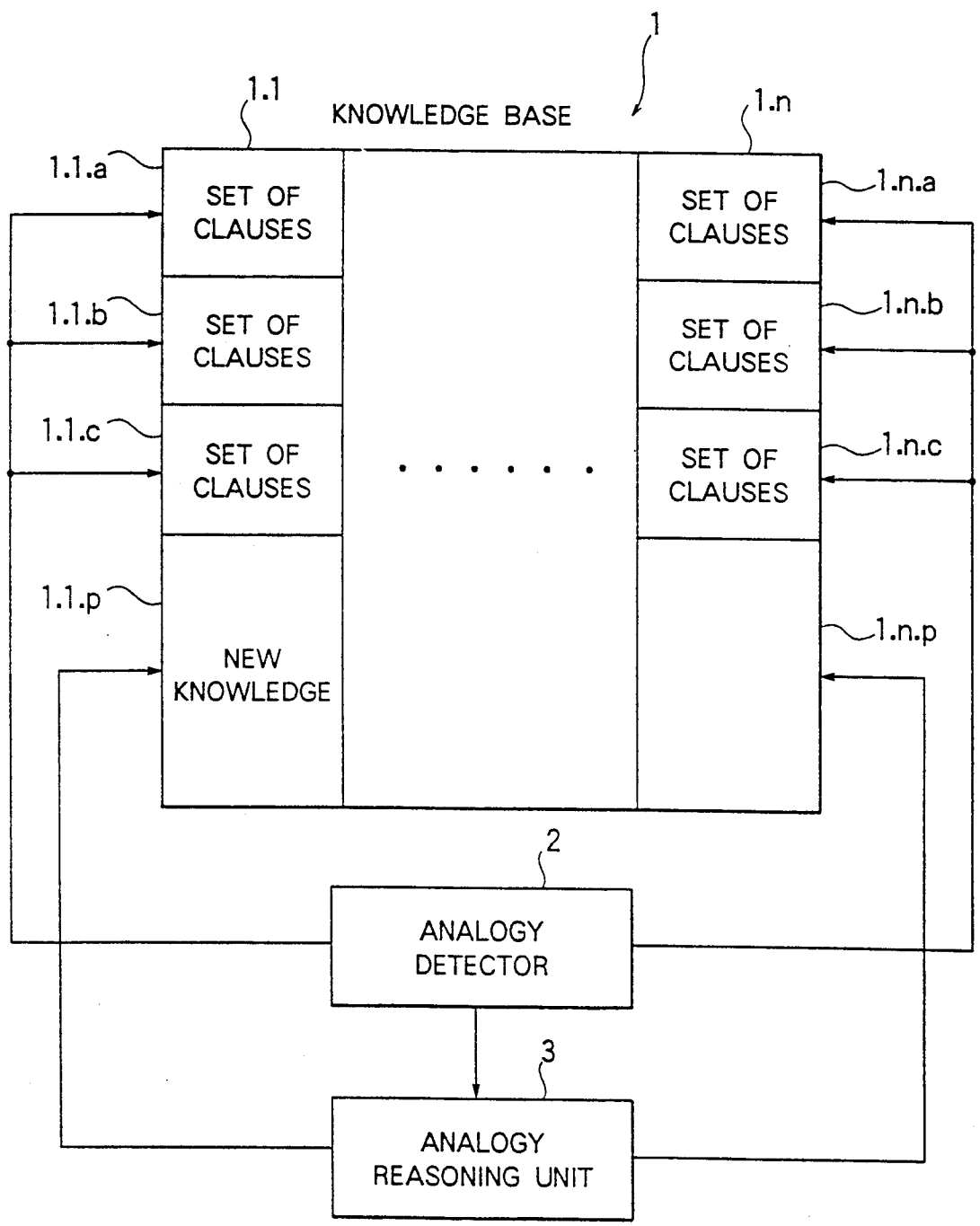
FIG. 1 is a block diagram showing the structure of an analogical reasoning device as an embodiment of the present invention.

Some embodiments of the present invention are now described in details referring to the drawings.

FIG. 1 is a block diagram to show the structure of the analogical reasoning device as an embodiment of the present invention. In this figure, the numeral 1 indicates a knowledge base. The knowledge base 1 stores a group of knowledge data divided into some domains from 1.1 to 1.n according to a certain division standard. The knowledge contained in the domains 1.1 to 1.n is described and expressed by Prolog notation after being divided into some sets of a plurality of clauses 1.1.a, 1.1.b, 1.1.C, 1.n.a., 1.n.b, and 1.n.c. Each of such sets are called "Horn clause" (representing explanation of concept).

The numeral 2 is an analogy detector. The analogy detector 2 compares (i.e., examines the concepts/non-logic symbols and information relating thereto) the knowledge in a domain of the knowledge base 1 with those in other domains set by set, such set including some clauses which explain a concept. When the detector finds a pair of sets of clauses which can be made identical by changing some of the concepts (non-logic symbols), then it judges that the two domains (each containing one set of the pair) are similar.

The numeral 3 is the analogical reasoning unit which performs analogical reasoning for knowledge between the two domains which are judged to be similar by the analogy detector 2. The analogical reasoning unit 3 searches for a knowledge containing the concept common to the similar domains and assumes new knowledge 1.1.$p$ and 1.$n$.$p$ by replacing some of the concepts in the knowledge it finds out with the concept from the other domain.

Figure 2:
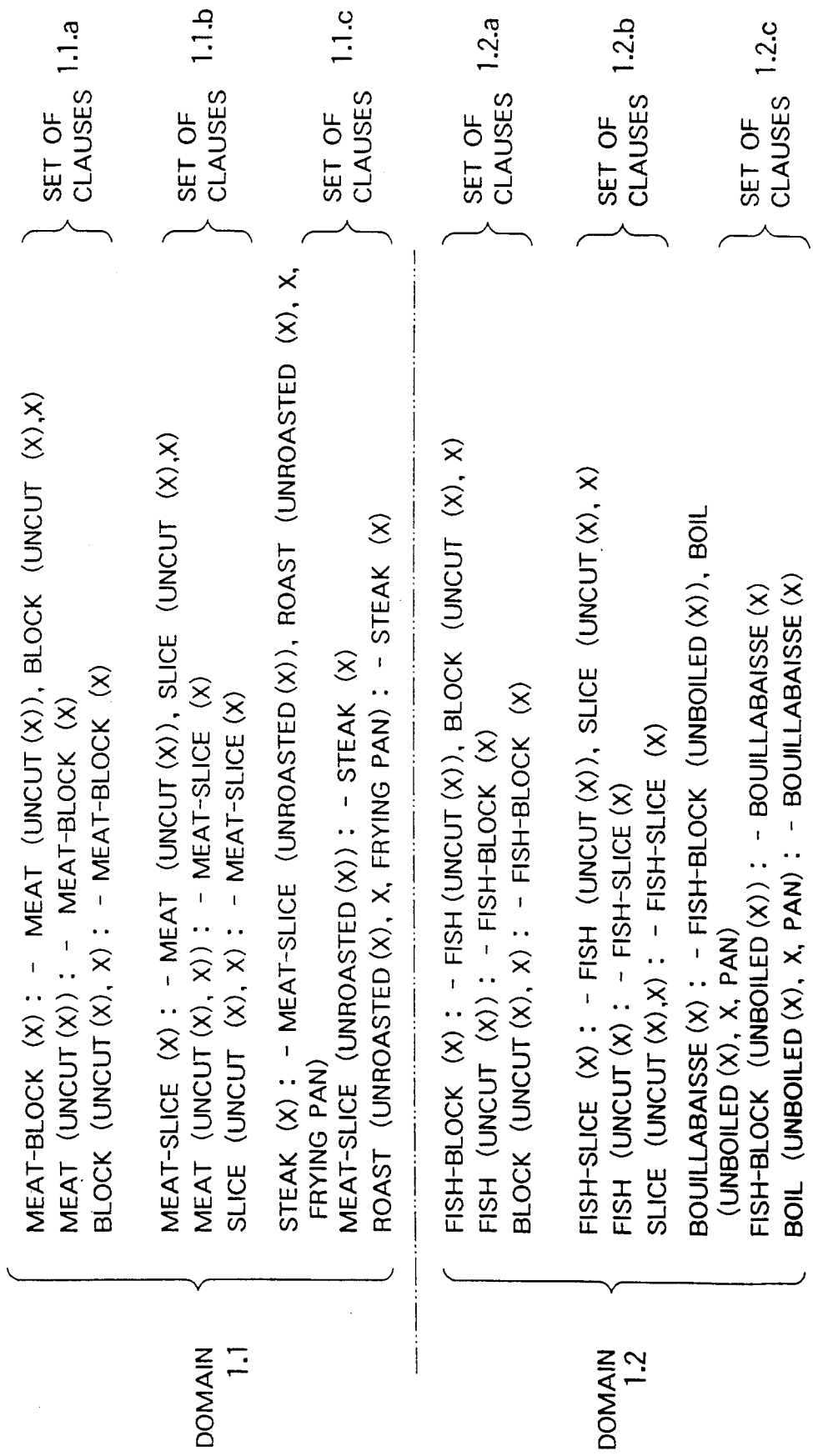
FIG. 2 shows a part of the knowledge base contents in the analogical reasoning device of FIG. 1.
Figure 3:
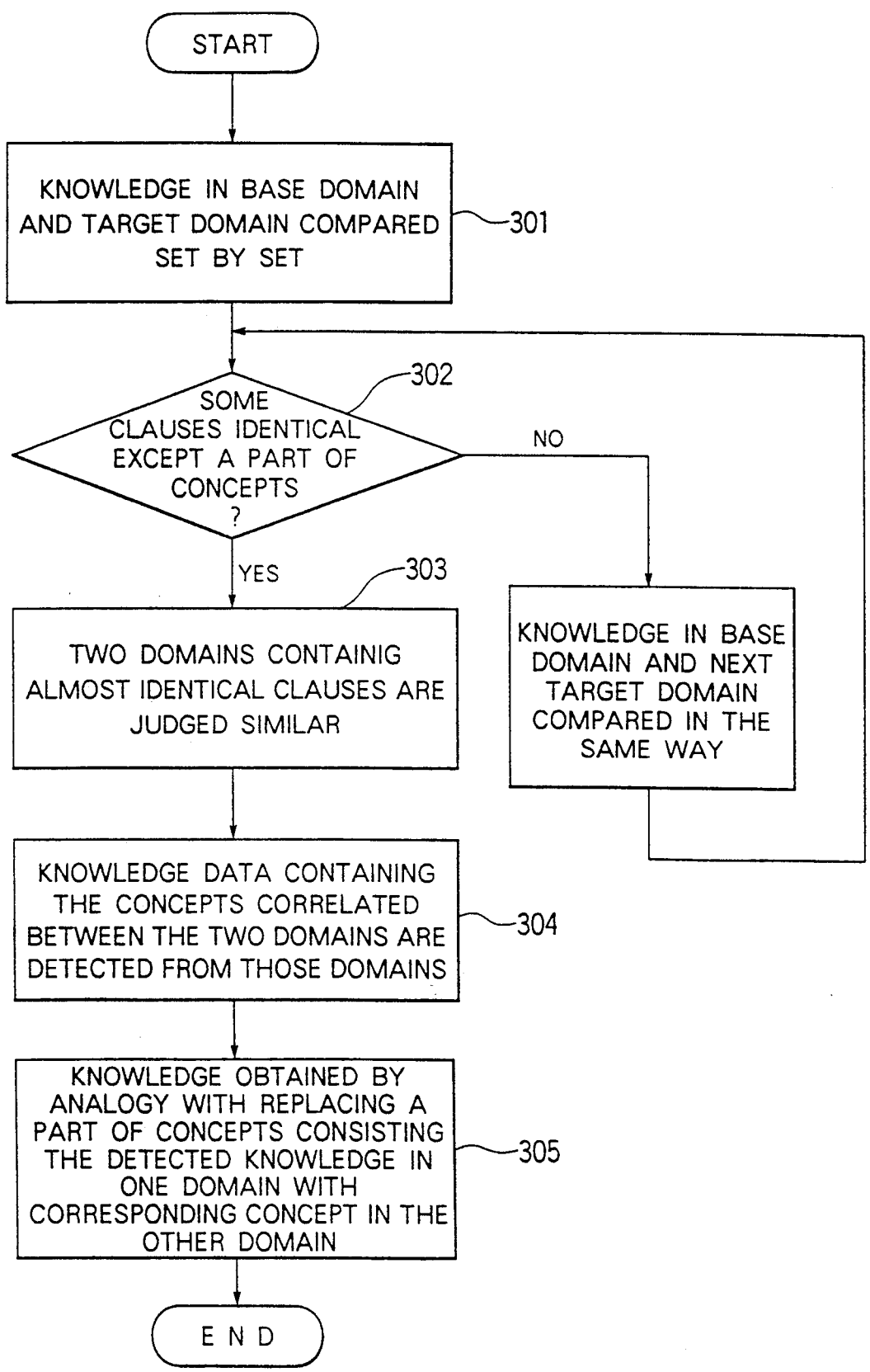
FIG. 3 is a flowchart showing the flow of analogical reasoning in the analogical reasoning device of FIG. 1.

The method of analogical reasoning in this embodiment is now specifically described referring to FIGS. 2 and 3. FIG. 2 specifically shows a part of the knowledge base 1. In this embodiment, the knowledge base 1 stores knowledge on food cooking method. The knowledge base 1 is divided into domains by different cooking materials such as meat and fish. The numeral 1.1 is the knowledge domain concerning meat, and 1.2 is the one concerning fish. Description on each line corresponds to a "clause" above. In this embodiment, clauses are grouped every three lines and these groups are treated as sets of clauses 1.1.$a$, 1.1.$b$, 1.1.$c$, 1.2.$a$, 1.2.$b$, and 1.2.$c$. They are the units for similarity judgment by the analogy detector 2.

The analogy detector 2 first takes the domain 1.1 in the knowledge base 1 as the base domain. It compares the knowledge data in this domain 1.1 and those contained in all other domains (target domains) set by set (Step 301).

In the process where the detector compares the base domain 1.1 with a target domain 1.2, if it detects any pair of clauses which can be made identical just by replacing a part of the concepts, i.e. some of the non-logical symbols (Step 302), then it is judged that the domains 1.1 and 1.2 are similar (Step 303).

Specifically, "meat-block" in the set of clauses 1.1.$a$ contained in the base domain 1.1 and "fish-block" in the set of clauses 1.2.$a$ contained in the target domain 1.2 have the same concept "block". It is judged here that they can be made identical by changing the concept "meat" or "fish". As a result, the domains 1.1 and 1.2 are judged to be similar. The same reasoning applies to the relation between "meat-slice" in the set of clauses 1.1.$b$ and "fish-slice" in the set of clauses 1.2.$b$.

Next, the analogical reasoning unit 3 gives analogical reasoning for knowledge between the similar domains 1.1 and 1.2. as follows.

The analogical reasoning unit 3 first finds out other knowledge data containing the concepts correlated between the domains 1.1 and 1.2: data containing "meat-block" or "meat-slice" from 1.1 and those containing "fish-block" or "fish-slice" from 1.2 (Step 304).

As a result, the knowledge on "steak" containing the concept of "meat-slice" is found out from the base domain 1.1. From the target domain 1.2, the knowledge on "bouillabaisse" containing the concept of "fish-block" is found out.

Then, the analogical reasoning unit 3 judges what concepts correspond each other between the knowledge data found out from 1.1 and 1.2. The unit takes such corresponding concepts as subjects of replacement, and assumes new knowledge by replacing a part of the knowledge in one domain with the knowledge from the other domain (Step 305).

Specifically, the analogical reasoning unit 3 assumes as new knowledge "block meat boiled in a pan" by replacing a part of concepts consisting of the knowledge on bouillabaisse with "meat-block" as well as "sliced fish roasted in a frying pan" by replacing a part of concepts consisting of the knowledge on steak with "fish-slice".

Therefore, the analogical reasoning device of the present embodiment is capable of giving analogical reasoning similar to human thinking, since it recognizes similarity of different domains in the knowledge base 1 when it detects two knowledge data which can be made identical just by replacing some of the concepts from those domains.

In addition, new knowledge can be assumed by reflecting a knowledge data in a domain in the other domain between the similar domains 1.1 and 1.2. This enables a high-level analogical reasoning which is close to the human way of thinking and covers a wide range.

In FIG. 3, processing ends after the analogical reasoning of Step 305, but the flow can be returned to Step 301 after analogical reasoning to proceed to a next analogical reasoning.

Another embodiment of the present invention is described below.

Figure 4:
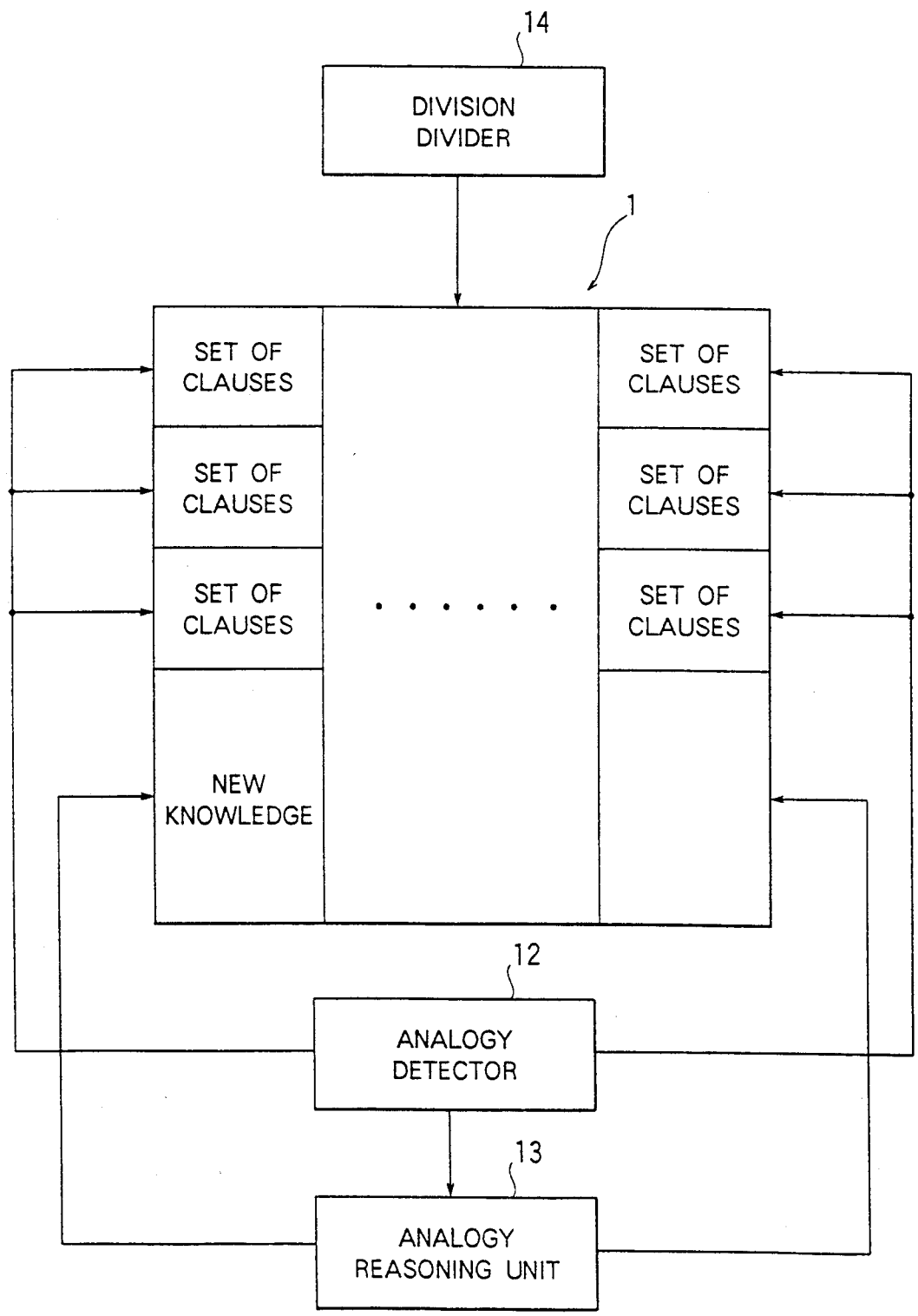
FIG. 4 is a block diagram showing the structure of an analogical reasoning device as another embodiment of the present invention.

FIG. 4 is a block diagram showing the configuration of an analogical reasoning device as another embodiment.

In this figure, the numeral 11 is a knowledge base, 12 is an analogy detector and 13 is an analogical reasoning unit. The numeral 14 is a domain divider to divide the knowledge data group in the knowledge base 11 into some domains according to an arbitrary standard. The analogy detector 12 and the analogical reasoning unit 13 have the same function as described in above embodiment.

In this embodiment, the domain divider 14 uses as the division standard a list of non-logic symbols which is allowed to be used for the knowledge in more than one domain. In addition, division into domains is specifically performed by changing the labels to indicate the domain name attached to each set of clauses in the knowledge base 11.

Figure 5:
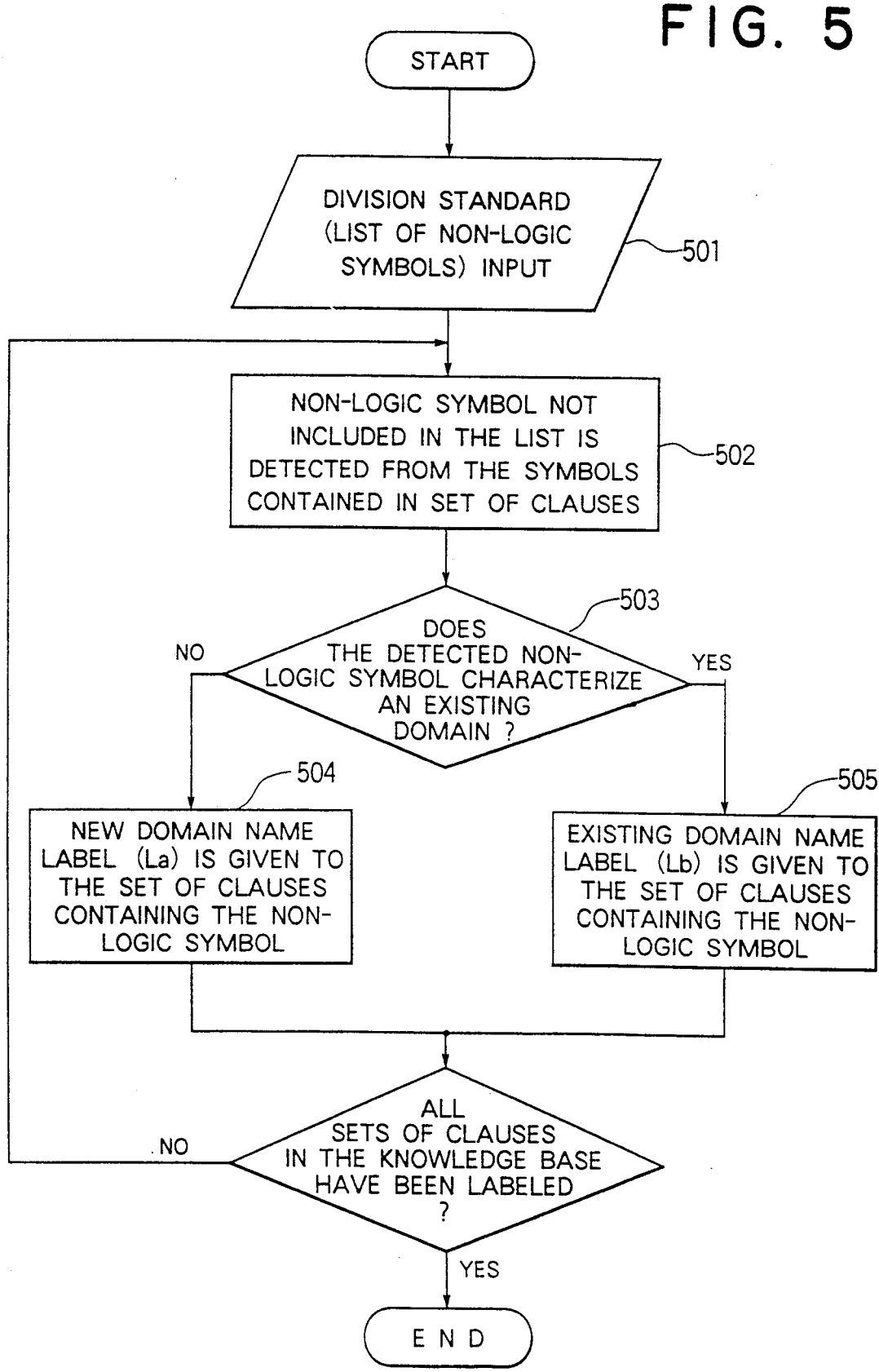
FIG. 5 is a flowchart showing the flow of domain division in the analogical reasoning device of FIG. 4.

The flow of domain dividing is described below with referring to FIG. 5.

Upon input of a division standard (Step 501), the domain divider 14 makes reference to sets of clauses from the initial address in the knowledge base 11 and detects any non-logic symbol not included in the above list of non-logic symbols from those contained in the set of clauses (Step 502).

Next, the domain divider 14 judges whether the detected non-logic symbol is the same as any non-logic symbol characterizing an already existing domain (Step 503). If not, the domain divider 14 determines that this set of clauses including such non-logic symbol as a knowledge data belonging to a new domain, and gives a new domain name label (La) to this set of clauses (Step 504). If it is the same as any of the existing domain symbols, the name label (Lb) of the domain characterized by that non-logic symbol is given to the set of clauses (Step 505).

For the remaining sets of clauses, too, the domain divider 14 detects non-logical symbols not contained in the list of non-logic symbols from the knowledge base 11, checks them to determine if they are the same as non-logic symbols which characterize existing domains, and provides the label La or Lb to the sets of clauses including the detected non-logical symbols: La for the symbols not characterizing any existing domain and Lb for the symbols characterizing any of existing domains.

Figure 6:
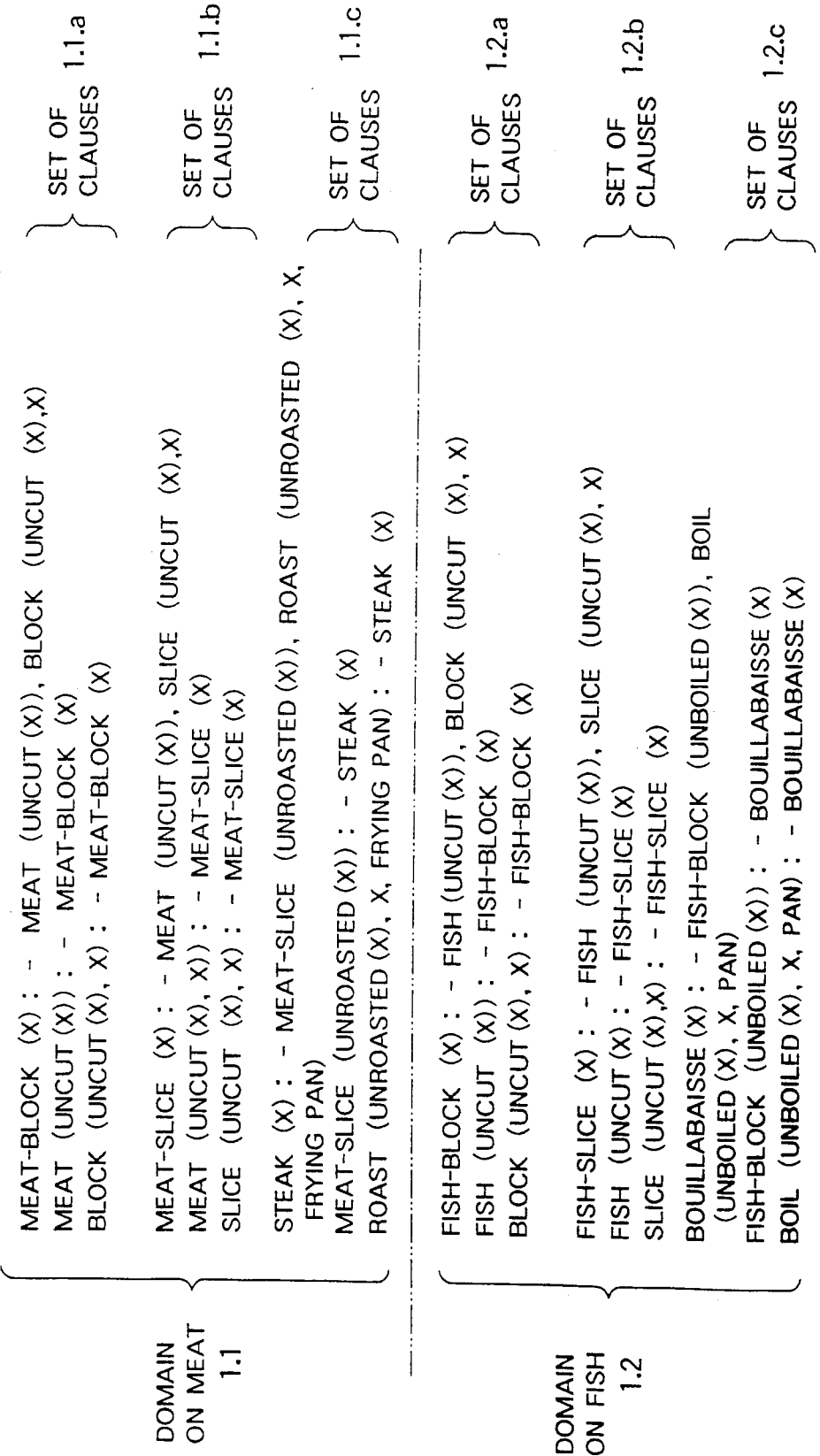
FIG. 6 shows the knowledge base divided into two domains: one concerning "meat" and the other concerning "fish"

FIG. 6 shows the knowledge base 11 divided by the domain divider 14 into the domain of the knowledge on meat 11.1 and the domain of knowledge on fish 11.2.

In this case, the analogy detector 12 searches the domains 11.1 and 11.2, finds similarities between the set of clauses 11.1.*a* on "meat-block" and the set of clauses 11.2.*a* on "fish-block" as well as the set of clauses 11.1.*b* on "meat-slice" and 11.2.*b* on "fish-slice", and judges that the domains 11.1 and 11.2 are similar.

Then, the analogical reasoning unit 13 searches the domains 11.1 and 11.2 for other knowledge data including the concepts correlated between 11.1 and 11.2, i.e. "meat-block" and "meat-slice" in 11.1 and "fish-block" and "fish-slice" in 11.2. From the knowledge data the unit finds out, it assumes new knowledge data "block meat boiled in a pan" and "sliced fish roasted in a frying pan" by having the data in one domain reflected by the data in the other domain.

FIG. 7 shows the knowledge base 11 divided by the domain divider 14 into the domain of knowledge on block 11.1 and the domain of knowledge on slice 11.2.

In this case, the analogy detector 12 searches the domains 11.1 and 11.2, finds similarities between the set of clauses 11.1.*a* on "meat-block" and the set of clauses 11.2.*a* on "meat-slice" as well as the set of clauses 11.1.*b* on "fish-block" and 11.2.*b* on "fish-slice", and judges that the domains 11.1 and 11.2 are similar.

Then, the analogical reasoning unit 13 searches the domains 11.1 and 11.2 for other knowledge data including the concepts correlated between 11.1 and 11.2, i.e. "meat-block" and "fish-block" in 11.1 and "meat-slice", "fish-slice" in 11.2. From the knowledge data the unit found out, it assumes new knowledge data "block meat roasted in a frying pan" and "sliced fish boiled in a pan" by having the data in one domain reflected by the data in the other domain.

Thus, this embodiment enables various analogical reasoning without changing any knowledge in the knowledge base 11 by dividing the knowledge base 11 according to various standards.

Still another embodiment of the present invention is described below.

Figure 8:
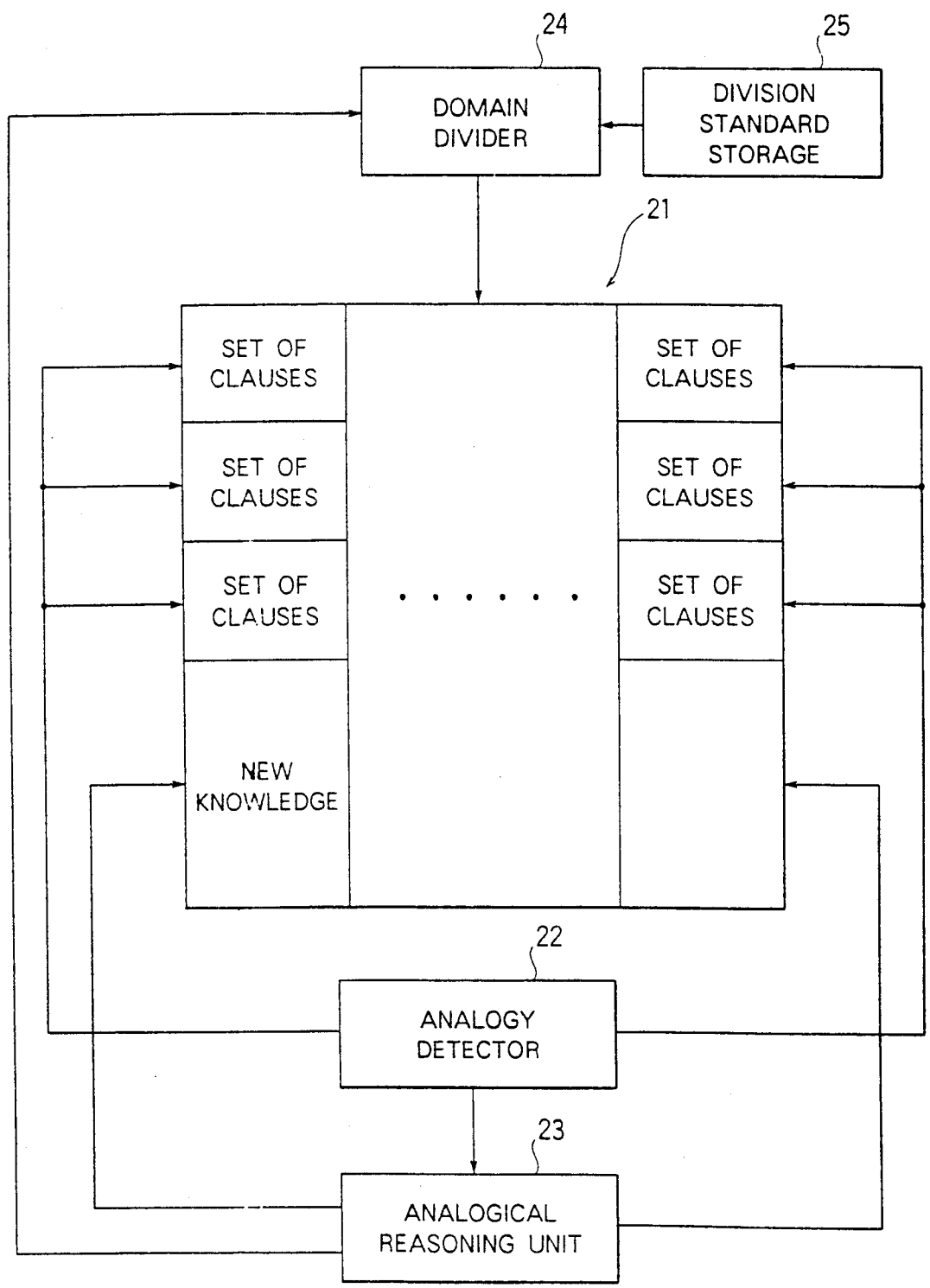
FIG. 8 is a block diagram showing an analogical reasoning device structure as still another embodiment of the present invention.

FIG. 8 is a block diagram showing the configuration of the analogical reasoning device as a third embodiment.

In this figure, the numeral 21 is a knowledge base, 22 is an analogy detector, 23 is an analogical reasoning unit, 24 is a domain divider. The numeral 25 indicates a division standard storage to store more than one division standard (list of non-logic symbols) for division of the knowledge base 21 into some domains. The knowledge base 21, the analogy detector 22, the analogical reasoning unit 23 and the domain divider 24 have the same functions as described for above embodiments.

Referring to FIG. 9, the operation of this analogy reasoning device is now described.

This device first divides the knowledge base 11 into some domains according to the first division standard stored in the division standard storage 25 following the steps 901 to 906.

Next, in the steps 907 to 912, analogical reasoning for knowledge is performed. If this analogical reasoning does not lead to any new knowledge (step 913), another division standard is read out from the division standard storage 25 and supplied to the domain divider 24, so that the knowledge base 21 is divided into domains according to this division standard different from the first one. Analogical reasoning for knowledge is performed again using this knowledge base 21 divided into different domains.

What is claimed is:

1. An analogical reasoning device, comprising:
memory means for storing a group of knowledge data described in non-logic symbols, which is divided into more than one domain according to a division standard,
judgment means for comparing the knowledge data of one domain with the knowledge data of at least one other domain stored in said memory means and determining similar domains containing knowledge data which can be made identical by replacing a part of said non-logic symbols of said at least one other domain, and
analogical reasoning means for performing an analogical reasoning by replacing said pat of said non-logic symbols of said at least one other domain with a part of said one domain.

2. An analogical reasoning device, comprising:
memory means for storing a group of knowledge data described in non-logic symbols,
division means for dividing the group of knowledge data stored in said memory means into a plurality of domains according to a division standard,
judgment means for comparing the knowledge data of one domain with the knowledge data of at least one other domain stored in said memory means and determining similar domains containing knowledge data which can be made identical by replacing a part of said non-logic symbols of said at least one other domain, and
analogical reasoning means for performing analogical reasoning by replacing said part of said non-logic symbols of said at least one other domain with a part of said one domain for the domains judged similar by said judgment means.

3. The analogy reasoning device of claim 2, wherein said division means comprises:
list input means for inputting a list of non-logic symbols allowed to be used for the knowledge data in the plurality of domains as the division standard,
detecting means for detecting non-logic symbols not contained in said list from said knowledge data,
judgment means for judging whether the non-logic symbols detected by said detecting means are symbols having characteristics of existing domains, and
domain division means for dividing the knowledge data into a first data group containing non-logic symbols with characteristics of said existing domains and a second data group containing non-logic symbols without characteristics of said existing domains and treating said first and second data groups as belonging to different domains.

4. An analogical reasoning device, comprising:
memory means for storing a group of knowledge data described in non-logic symbols,
division standard storage means for storing first and second sets of division standard data for dividing the knowledge data group stored in said memory means into a plurality of domains,
first division means for dividing the knowledge data group stored in said memory means into a plurality of domains containing the knowledge data according to the first set of division standard data stored in said division standard storage means,
judgment means for comparing the knowledge data in one domain with the knowledge data of other domains stored in said memory means and determining similar domains containing knowledge data which can be made identical by replacing a part of said non-logic symbols of said other domains, analogical reasoning means for performing analogical reasoning by replacing said part of said non-logic symbols of said other domains with a part of said one domain for the domains judged similar by said judgment means, and second division means for dividing the knowledge data group stored in said memory means into a plurality of domains according to the second set of division standard data stored in said division standard storage means when any knowledge is not obtained from analogy performed by said analogical reasoning means.

5. The analogy reasoning device of claim 4, wherein each of said first and second division means comprises:

list input means for inputting a list of non-logic symbols allowed to be used for knowledge data in a plurality of domains as the respective division standard of said first and second division means, detecting means for detecting non-logic symbols not contained in said list from said knowledge data, judgment means for judging whether the non-logic symbols detected by said detecting means are symbols having characteristics of existing domains, and domain division means for dividing the knowledge data into a first data group containing non-logic symbols with characteristics of said existing domains and a second data group containing non-logic symbols without characteristic of said existing domains and treating said first and second data groups as belonging to different domains.

6. An analogical reasoning method of making analogies for a group of knowledge data described in non-logic symbols stored in a memory means which is divided into a plurality of domains according to a division standard, comprising the steps of:

comparing the knowledge data in one domain with the knowledge data in at least one other domain stored in said memory means and determining similar domains containing knowledge data which can be made identical by replacing a part of said non-logic symbols of said at least one other domain, and performing analogical reasoning by replacing said part of said non-logic symbols of said at least one other domain with a part of said one domain.

7. An analogy reasoning method of making analogies by using a group of knowledge data described in non-logic symbols stored in a memory comprising the steps of:

dividing said knowledge data group into a plurality of domains according to a division standard, comparing the knowledge data in one of said domains with the knowledge data in at least one other of said domains and determining similar domains containing knowledge data which can be made identical by replacing a part of said non-logic symbols of said at least one other domain, and performing analogical reasoning by replacing said part of said non-logic symbols of said at least one other domain with a part of said one domain for the domains judged similar by said judgment step.

8. The analogy reasoning method of claim 7, wherein said division step comprises the steps of:

inputting a list of non-logic symbols allowed to be used for knowledge data in a plurality of domains as the division standard, detecting non-logic symbols of said knowledge data not contained in said list, judging whether the non-logic symbols detected by said detecting step are non-logic symbols having characteristics of existing domains, and dividing the knowledge data into a first data group containing non-logic symbols with characteristics of said existing domains and a second data group containing non-logic symbols without characteristics of said existing domains and treating the first and second data groups as belonging to different domains.

9. An analogy reasoning method of making analogies by using a knowledge data group described in non-logic symbols stored in a memory, comprising the steps of:

a first dividing step for dividing said knowledge data group stored in the memory into a plurality of domains according to a division standard, comparing the knowledge data in one of said domains with the knowledge data in at least one other of said domains and determining similar domains containing knowledge data which can be made identical by replacing a part of said non-logic symbols of said at least one other domain, performing analogical reasoning by replacing said part of said non-logic symbols of said at least one other domain with a part of said one domain for the domains judged similar by said judgment step, and a second dividing step for dividing the knowledge data group into a plurality of different domains according to the other division standard when new knowledge is not obtained by performing the analogical reasoning step.

10. The analogy reasoning method of claim 9, wherein each of said first and second division steps comprises the steps of:

inputting a list of non-logic symbol allowed to be used for knowledge data in a plurality of domains as the respective division standard, detecting non-logic symbols not contained in said list from said knowledge data, judging whether the non-logic symbols detected by said detecting step are symbols showing characteristics of existing domains, and dividing the knowledge data into a first data group containing non-logic symbols with characteristics of said existing domains and a second data group containing non-logic symbols without characteristic of said existing domains and treating said first and second data groups as belonging to different domains.

* * * * *

UNITED STATES PATENT AND TRADEMARK OFFICE
CERTIFICATE OF CORRECTION

PATENT NO. : 5,276,774
DATED : January 4, 1994
INVENTOR(S) : RYOHEI ORIHARA ET AL It is certified that error appears in the above-indentified patent and that said Letters Patent is hereby corrected as shown below:

Column 3, line 44, change "1.2." to --1.2--.

Column 4, line 28, after "in" insert --the--.

Column 6, line 14, change "pat" to --part--.

Signed and Sealed this

Fourth Day of April, 1995

Attest:

BRUCE LEHMAN

Attesting Officer     Commissioner of Patents and Trademarks